United States Patent
Wigger

(10) Patent No.: US 12,221,567 B2
(45) Date of Patent: Feb. 11, 2025

(54) DOUBLE-SIDED SELF-ADHESIVE VAPOR BARRIER

(71) Applicant: Uzin Utz Schweiz AG, Buochs (CH)

(72) Inventor: Thomas Wigger, Geuensee (CH)

(73) Assignee: Uzin Utz Schweiz AG, Buochs (CH)

( * ) Notice: Subject to any disclaimer, the term of this patent is extended or adjusted under 35 U.S.C. 154(b) by 0 days.

(21) Appl. No.: 16/343,649

(22) PCT Filed: Oct. 20, 2017

(86) PCT No.: PCT/EP2017/076830
§ 371 (c)(1),
(2) Date: Apr. 19, 2019

(87) PCT Pub. No.: WO2018/073406
PCT Pub. Date: Apr. 26, 2018

(65) Prior Publication Data
US 2019/0270915 A1 Sep. 5, 2019

(30) Foreign Application Priority Data
Oct. 21, 2016 (EP) ..................................... 16195064

(51) Int. Cl.
| | | |
|---|---|---|
| C09J 7/29 | (2018.01) | |
| C09J 5/00 | (2006.01) | |
| C09J 7/38 | (2018.01) | |
| E04F 15/02 | (2006.01) | |
| E04F 15/18 | (2006.01) | |
| E04F 15/22 | (2006.01) | |

(52) U.S. Cl.
CPC . *C09J 7/29* (2018.01); *C09J 5/00* (2013.01); *C09J 7/385* (2018.01); *C09J 7/387* (2018.01); *E04F 15/02155* (2013.01); *E04F 15/182* (2013.01); *E04F 15/185* (2013.01); *E04F 15/187* (2013.01); *E04F 15/22* (2013.01); *C09J 2301/124* (2020.08); *C09J 2301/302* (2020.08); *C09J 2301/414* (2020.08); *C09J 2400/163* (2013.01); *C09J 2400/226* (2013.01); *C09J 2400/263* (2013.01); *C09J 2423/046* (2013.01); *C09J 2433/00* (2013.01); *C09J 2453/00* (2013.01)

(58) Field of Classification Search
CPC ..... C09J 7/29; C09J 7/387; C09J 7/385; C09J 5/00; C09J 2301/124; C09J 2301/302; C09J 2301/414; C09J 2400/163; C09J 2400/226; C09J 2400/263; C09J 2423/046; C09J 2433/00; C09J 2453/00; E04F 15/185; E04F 15/02155; E04F 15/22; E04F 15/182; E04F 15/187
See application file for complete search history.

(56) References Cited

U.S. PATENT DOCUMENTS

| | | | | |
|---|---|---|---|---|
| 3,630,980 | A | * | 12/1971 | Russell .................. C09J 153/02 |
| | | | | 526/329 |
| 4,751,122 | A | | 6/1988 | May et al. |
| 5,332,616 | A | | 7/1994 | Patrick et al. |
| 6,329,465 | B1 | | 12/2001 | Takahashi et al. |
| 8,277,915 | B2 | | 10/2012 | Couturier |
| 2003/0186048 | A1 | | 10/2003 | Sieber et al. |
| 2006/0247369 | A1 | * | 11/2006 | Griswold ............... C08G 18/69 |
| | | | | 524/588 |
| 2007/0248817 | A1 | * | 10/2007 | Sieber ...................... C09J 7/22 |
| | | | | 428/343 |
| 2007/0275196 | A1 | | 11/2007 | Opuszko |
| 2008/0145610 | A1 | | 6/2008 | Muller et al. |
| 2010/0255162 | A1 | | 10/2010 | Becraft et al. |
| 2011/0011515 | A1 | * | 1/2011 | Blasdel ................. E02D 31/025 |
| | | | | 428/346 |
| 2013/0052386 | A1 | * | 2/2013 | Slongo .................... B32B 27/36 |
| | | | | 428/354 |
| 2013/0086869 | A1 | * | 4/2013 | Couturier ............ E04F 13/0887 |
| | | | | 52/746.1 |
| 2016/0160101 | A1 | * | 6/2016 | Dickens ..................... C09J 9/02 |
| | | | | 252/511 |
| 2017/0058510 | A1 | | 3/2017 | Seabaugh |

FOREIGN PATENT DOCUMENTS

| | | | |
|---|---|---|---|
| CN | 203792801 | | 8/2014 |
| DE | 202004018380 | U1 * | 1/2005 |
| EP | 0 567 110 | | 4/1993 |
| EP | 0 569 921 | B1 | 1/2000 |
| EP | 1506984 | A1 | 2/2005 |
| EP | 1632341 | A1 | 3/2006 |
| EP | 2347684 | A1 | 7/2011 |

(Continued)

OTHER PUBLICATIONS

DE202004018380U1 Machine Translation of Description (EPO/Google) (Year: 2021).*
DE202004018380U1 Machine Translation of Claims (EPO/Google) (Year: 2021).*
Khan et al., "Natural Rubber-Based Pressure-Sensitive Adhesives: A Review," J Polym Environ (2011) 19:793-811 (Springer). (Year: 2011).*
Acronal A 280 (Jun. 12, 2007).
Acronal® A 240 (Sep. 2008).
Airflex® EAF60 Dispersion (Apr. 30, 2007).
Alberdingk® AC 7522 VP Kunststoff-Dispersion (Jul. 6, 2004).
Aquatack X1403 Provisional Product Data Sheet (Mar. 18, 2009).
Eukalin (Feb. 15, 2016).

(Continued)

*Primary Examiner* — Cynthia L Schaller

(57) ABSTRACT

The invention relates to a vapor barrier which is self-adhesive on both sides, comprising at least one moisture barrier layer, a carrier film, a first pressure-sensitive adhesive layer which is resistant to moisture, a second pressure-sensitive adhesive layer which is present on a side of the carrier film opposite the first pressure-sensitive adhesive layer, and a removable covering layer which has been applied to the second pressure-sensitive adhesive layer on a side of the self-adhesive vapor barrier facing the surroundings opposite the carrier film.

14 Claims, No Drawings

(56) References Cited

FOREIGN PATENT DOCUMENTS

| EP | 3 312 249 | | 4/2018 |
|---|---|---|---|
| WO | WO98/02089 | A1 * | 1/1998 |
| WO | WO 2015/126931 | | 8/2015 |
| WO | WO 2016/038106 | | 3/2016 |
| WO | WO 2016/038106 | A1 | 3/2016 |
| WO | WO 2018/073406 | A1 | 4/2018 |

OTHER PUBLICATIONS

European Partial Search Report corresponding to European Patent Application No. 16 195 064.7 dated Jul. 14, 2017.
European Search Report for EP 3 312 249 dated Jul. 24, 2017.
European Search Report corresponding to European Patent Application No. 16 195 064.7 dated Jan. 26, 2021.
European Search Report corresponding to European Patent Application No. 16 195 064.7 dated Sep. 14, 2021.
Intercol by Technical datasheet HM 2007, Version Jan. 2011 (undated).
Johnston, "Pressure Sensitive Adhesive Tapes", Chapter 2, "How Pressure Sensitive Adhesives Work", pp. 23-27; and Chapter 8, "Design Considerations for a Specific End Use or Process", pp. 137-178 (Jan. 1, 2000).
Klander, 2017.
Lunamelt™ PS 7900 ZP (Nov. 5, 2016).
Novamelt® PS 2050 (2008).
Office Action corresponding to European Patent Application No. 16195064.7 dated Sep. 14, 2021.
SBU Functional Polymers, Industrial Segment "Adhesives", Pressure Sensitive Adhesives (Sep. 2013).
Vinnapas® AF 474 (Mar. 4, 2011).
Office Action corresponding to European Patent application No. 16195064.7 dated Apr. 17, 2023.
Written Opinion of the International Searching Authority corresponding to International application No. PCT/EP2017/076840 dated Dec. 5, 2017.

* cited by examiner

DOUBLE-SIDED SELF-ADHESIVE VAPOR BARRIER

The present invention relates to a vapor barrier which is self-adhesive on both sides, comprising at least one moisture barrier layer, a carrier film, a first pressure-sensitive adhesive layer which is resistant to moisture, a second pressure-sensitive adhesive layer which is present on a side of the carrier film opposite the first pressure-sensitive adhesive layer, and a removable covering layer which has been applied to the second pressure-sensitive adhesive layer on a side of the self-adhesive vapor barrier facing the surroundings opposite the carrier film. An elastic or textile floor covering can be adhesively bonded directly on top of this.

To produce new concrete floors and screeds, considerable amounts of water are required in order to achieve a suitable consistency. A large part of this water has to evaporate, or dry off, after the setting process before further layers can be applied or before a floor covering can finally be applied. Complete drying of concrete slabs requires many months up to about 3 years. Complete drying of screeds requires, depending on thickness, construction, composition and prevailing atmospheric conditions in the room, from several weeks to months. In order to be able to build up the next layers on the floor, the moisture in the floor, for example a concrete floor or a screed, preferably has to have dried off to a prescribed degree.

In order to shorten the delay time further, screeds and/or concrete floors containing residual moisture are provided with, for example, reactive vapor barriers, for example with 2K (2-component) epoxy, 2K-PU (polyurethane) or sometimes 1K-PU or 1K-silane coatings. These have to be applied in a plurality of layers, depending on the barrier action required. The last layer is usually sanded. After loose sand has been swept off, a troweling composition can be applied and, for example, an elastic floor covering or a carpet can be adhesively bonded to the dried troweling composition layer, for example by means of a dispersion adhesive or a reactive adhesive.

However, reactive vapor barriers and vapor barrier systems often present health problems during processing, since harmful, irritating, toxic or mutagenic crosslinkers are sometimes used. In addition, drying times of up to 24 hours are usually required for each application of a layer in order to be able to continue with the next operation. Depending on the troweling composition used, a further drying time of from 6 to 20 hours also has to be expected for the troweling composition layer in order to finally be able to adhesively bond the floor covering on top of this.

Vapor barrier layers are often laid loose between concrete slab and screed in order to protect the screed against the moisture in the concrete slab. Underlays having vapor barrier properties, which are either made self-adhesive on one side and are adhesively bonded onto the substrate, or nonadhesive underlays which are laid loose on the substrate or are adhesively bonded wet or conventionally onto the substrate, are sometimes also used on the screeds or on troweled substrates. Subsequently, a floor covering can be adhesively bonded to these underlays, for example using wet adhesives or conventional adhesives. This requires long drying times since these underlays cannot take up the moisture from the adhesives and are "nonabsorptive". In particular, it is necessary to usually wait for at least 24 to 72 hours after laying of the floor covering before the freshly laid floor covering can be subjected to loads. Otherwise, squashing of the adhesive layer and/or a poor visual appearance has to be reckoned with. Owing to the thickness and ductility of the underlays, many floor coverings cannot be laid thereon.

Although these underlays can be laid quickly, they do not offer sufficient laying comfort. In most cases, they have only a small and therefore unsatisfactory ability to equalize unevennesses, so that a troweled or flat-ground substrate generally has to be present to accommodate the vapor barrier.

Vapor barriers for various substrates are known, for example, from DE 10 2011 011292 A1.

There is a need to provide a vapor barrier system which allows quick laying of same on sufficiently flat and smooth, moisture-resistant substrates containing residual moisture, for example float-smooth concrete or cement-based troweling composition, without additional drying times and delay times, and on which a floor covering or floor which can immediately be able to bear full loads can be laid directly. In addition, a vapor barrier system which allows quick laying of same on sufficiently flat and smooth, moisture-resistant substrates containing residual moisture, without additional drying times and delay times, on top of which a, for example, elastic or textile floor covering can be adhesively bonded directly should be provided. The substrate containing residual moisture should be sealed sufficiently by the vapor barrier system for a, for example, elastic or textile floor covering to be able to be laid quickly on top of the vapor barrier system.

The invention provides a vapor barrier, which is self-adhesive on both sides, having a vapor barrier, preferably a vapor block, which quickly and easily leads to the objective, with a textile or elastic floor covering being able to be laid, for example adhesively bonded, directly on top of the double-sided self-adhesive vapor barrier. Advantageously, no delay times or drying times are required for this purpose and the floor covering is immediately able to withstand full loads after laying.

According to a first aspect, the present invention provides a vapor barrier which is self-adhesive, comprising:
at least one carrier film;
at least one moisture barrier layer;
a first pressure-sensitive adhesive layer which is resistant to moisture and is present on a side of the self-adhesive vapor barrier facing the surroundings;
a second pressure-sensitive adhesive layer which is present on a side of the carrier film opposite the first pressure-sensitive adhesive layer; and
a removable covering layer which has been applied to the second pressure-sensitive adhesive layer on a side of the self-adhesive vapor barrier facing the surroundings opposite the carrier film,
wherein the first pressure-sensitive adhesive layer has, after application to a moisture-saturated fibrocement sheet, a peel resistance measured by a method based on DIN EN 1939: 2003 of ≥3.0 N/25 mm, and
wherein the first pressure-sensitive adhesive layer has a peel resistance measured by a method based on DIN EN 1939: 2003 of ≥3.0 N/25 mm after accelerated aging on a moisture-saturated fibrocement sheet for 28 days at 50° C. with retention of the moisture content.

According to a further aspect, the present invention provides for the use of the self-adhesive vapor barrier according to the invention for laying on a substrate containing residual moisture.

In addition, the present invention provides a method for applying a self-adhesive vapor barrier to a substrate containing residual moisture, comprising:

application of the self-adhesive vapor barrier according to the invention to the substrate containing residual moisture, wherein the first pressure-sensitive adhesive layer is applied to the substrate containing residual moisture.

Further aspects of the present invention can be derived from the dependent claims and the detailed description.

DEFINITIONS

For the purposes of the invention, moisture saturation is a state in which a material, body or field, e.g. a fibrocement sheet, has taken up such a large amount of moisture that further uptake would under the ambient conditions lead to an energetically less favorable state, in particular at a standard pressure of 101,325 Pa and a temperature of from 5 to 95° C., in particular a room temperature of from 20 to 25° C., and also at an elevated temperature of, for example, 50° C. This can be ensured by the fibrocement sheet always being present in water so that the fibrocement sheet can optionally take up further water.

A pressure-sensitive adhesive is a physically adhering adhesive which, after application to a carrier material such as a carrier film, remains highly viscous and tacky in the long term and can then be applied by means of pressure to a substrate and remain adhering there. In contrast to chemically or physically curing adhesives, pressure-sensitive adhesives do not have setting processes.

Pressure-sensitive adhesive layers, e.g. of adhesive tapes, are pressure-sensitively adhesive because of their physicochemical properties, with the adhesion being determined by physical effects. In contrast to some reactive adhesives, pressure-sensitive adhesive layers cannot form any chemical bonds with a substrate. Microscopic interfacial effects, e.g. wetting of the substrate surface, which is partly determined by the "softness" of the pressure-sensitive adhesive layer, are important for the achievement of adhesion. However, it is basically important to achieve a very large-area, intimate contact between a pressure-sensitive adhesive layer and a substrate.

Many adhesive systems utilize changes of state, e.g. as a result of drying, crosslinking, cooling, etc., firstly to achieve the desired areal contact and secondly to have still enough cohesion for force transmission, namely adhesive effect. These changes of state are brought about by chemical (e.g. crosslinking, polymerization, etc.) or physical (e.g. cooling, evaporation of solvents, etc.) setting processes. These possibilities are not present in the case of pressure-sensitive adhesive layers. These have to be sufficiently "soft" for intimate areal contact and at the same time be sufficiently "hard" or cohesive to be able to transmit the adhesive forces. Pressure-sensitive adhesives are thus viscoelastic materials. These materials are not pure materials but instead always industrial mixtures or materials which are made up of many substances, e.g. polymers of differing molar mass, differing sequence, starter molecules, emulsifiers, stabilizers, reaction regulators, solubilizers, etc. The parameters important for the properties of the resulting materials are not available to a person skilled in the art for the development of industrial chemical products in building and construction.

It is generally postulated that to achieve adhesive tack, the glass transition temperature of the pressure-sensitive adhesive layer has to be at least 15 K to about 35 K below the processing temperature. Furthermore, the adhesion is influenced by various forces of attraction and repulsion, e.g. van der Weals forces, dipole forces, etc. Here, the chemical nature of the participating surfaces plays an important role, but this is in practice never known in sufficient detail.

Despite many opinions in respect of adhesion, there is not any reliable, calculatable model which indicates how the appropriate adhesion can be obtained for a particular substrate. However, it is known that the adhesion is determined not only by the properties of a pressure-sensitive adhesive layer or the properties of a substrate surface but instead arises only by interaction between the respective surfaces. This means that different degrees of adhesion are attained by means of a pressure-sensitive adhesive layer on various substrate surfaces, as will also be demonstrated by way of example below.

In general, the structure and properties of the substrate surfaces are only inadequately known to a person skilled in the art for the development of industrial chemical products and no detailed information about the precise chemical make-up of the raw materials is known. Only by means of empirical studies can the adhesion properties be determined and a fitting product thus be developed. In reality, a person skilled in the art therefore has to formulate suitable approaches to a solution for development of industrial chemical products from the possible raw materials available and test these in a targeted manner. In summary, the detailed chemical constituents of the adhesives are not relevant to the industrial development of self-adhesive products, since firstly the relevant information regarding the surfaces, the adhesives and further participating materials and also an applicable, reliable theory regarding the adhesion mechanisms are entirely missing.

For this reason, pressure-sensitive adhesives and pressure-sensitive adhesive layers produced therefrom are still usually characterized by means of parameters as are described in, for example, "Pressure Sensitive Adhesive Tapes, A guide to their function, design, manufacture, and use", John Johnston, 2013, chapter 2 "How pressure sensitive adhesives work", chapter 8 "Design", and chapter 9 "Testing". The development of such parameters is therefore of great interest to a person skilled in the field in order to be able to take these into account in further product development and also in specific projects.

A reasonable range of raw materials can then be selected for targeted tests in collaboration with raw materials suppliers. Targeted empirical experiments by means of the defined features, when they have been correctly determined, lead with justifiable effort to the objective.

In the case of known products, for example packaging tapes, which are merely being modified or optimized, the relevant features are known. However, the relevant features firstly have to be determined for different products, for instance for self-adhesive vapor barriers for laying on substrates containing residual moisture. In the light of this background, the present invention has been made.

The first aspect of the present invention relates to a self-adhesive vapor barrier, comprising:
  at least one carrier film;
  at least one moisture barrier layer; and
  a first pressure-sensitive adhesive layer which is resistant to moisture and is present on a side of the self-adhesive vapor barrier facing the surroundings;
  a second pressure-sensitive adhesive layer which is present on a side of the carrier film opposite the first pressure-sensitive adhesive layer; and
  a removable covering layer which has been applied to the second pressure-sensitive adhesive layer on a side of the self-adhesive vapor barrier facing the surroundings opposite the carrier film,
wherein the first pressure-sensitive adhesive layer has, after application to a moisture-saturated fibrocement sheet, a peel resistance measured by a method based on DIN EN 1939: 2003 of ≥3.0 N/25 mm, preferably ≥6.0 N/25 mm, and wherein the first pressure-sensitive adhesive layer has a peel resistance measured by a method based on DIN EN 1939: 2003 of ≥3.0 N/25 mm, preferably ≥6.0 N/25 mm, after accelerated aging on a moisture-saturated fibrocement sheet for 20 days, preferably for 28 days, more preferably for 41 days, at 50° C. with retention of the moisture content.

A self-adhesive vapor barrier here is a film which is able to adhere to a substrate by means of at least one pressure-sensitive adhesive layer, for example the first pressure-sensitive adhesive layer, wherein the first pressure-sensitive adhesive layer is able here to adhere to a substrate containing residual moisture. In addition, the first pressure-sensitive adhesive layer is resistant to moisture as a result of satisfactory fastening to a substrate containing residual moisture being ensured, which can be determined, for example, via the peel resistance. This resistance is preferably also present after aging.

For the purposes of the present invention, a vapor barrier is a barrier to migrating or diffusing moisture; for example generally to diffusion of water, for example osmosis.

The measurement of the peel resistance is, according to the invention, carried out in a manner analogous to DIN EN 1939:2003 using the identical test methods but using project-specific substrates. This means that the overall test is carried out precisely in accordance with the provisions of DIN EN 1939:2003, but the substrate indicated there is replaced by the present, moisture-saturated fibrocement sheet. The materials indicated in the standard do not make it possible to simulate a substrate which contains residual moisture and comes into contact with and is joined to the self-adhesive vapor barrier of the invention during actual laying.

According to the standard, the measurement is carried out after application according to the method indicated in the standard or after accelerated aging. Testing is in each case carried out under standard atmospheric conditions, i.e. at 23° C. and 50% atmospheric humidity, also after accelerated aging.

Adhesive forces on standard substrates such as steel (V2A) or glass are usually reported on data sheets. It has been found that the measured values given on the data sheets can serve merely as starting point for a rough selection of adhesives and these have to be specifically tested in each case.

In development of a product, it is quite common that in order to select an adhesive it will be necessary to test the adhesive properties of the respective pressure-sensitive adhesives on the project-specific substrates and also the project-specific floor coverings and also the resistance to the conditions occurring in the planned use. This applies particularly to adhesives which are to be adhesively bonded to substrates containing residual moisture. A moisture-saturated fibrocement sheet is therefore used instead of a substrate made of stainless steel for the present measurement of the peel resistance.

However, the measurement is otherwise carried out in accordance with DIN EN 1939:2003. For this purpose, test specimens in accordance with DIN EN 1939:2003 are produced and adhesively bonded to both dry and moisture-saturated fibrocement sheets and tested in accordance with the methods described in DIN EN 1939:2003.

The moisture saturation of the fibrocement sheet can, for example, be achieved here by the fibrocement sheet being laid in, for example, deionized water so that it is just not covered or just covered levelly with water, i.e. until an upper edge is surrounded on all sides by water or the upper side of the fibrocement sheet is covered by just a minimal amount of water, for example a water level having a height of less than 1 cm, for example less than 0.5 cm, 0.3 cm or 0.1 cm. On the underside, the fibrocement sheet can be located on the bottom of a suitable vessel for the water which does preferably not intervene in the system of water and fibrocement and preferably also does not react with the water, for example a vessel made of stainless steel.

For the present purposes, a fibrocement sheet is a commercial, untreated fibrocement sheet, for example Eterplan from Eternit.

In particular embodiments, the first pressure-sensitive adhesive layer also has, after application to a dry fibrocement sheet, a peel resistance measured by a method based on DIN EN 1939:2003 of ≥3.0 N/25 mm, preferably ≥6.0 N/25 mm.

For years of adhesion to moist substrates to function, not only should the initial adhesion be sufficient but it should also be ensured that the required adhesion properties are maintained over the entire life of a floor covering laid thereon. The life of floor coverings can be up to 20 years; the covering is often worn after 5-10 years and should be changed.

The resistance of the first pressure-sensitive adhesive layer of the inventive, self-adhesive vapor barrier with the moisture barrier layer, for example also referred to as vapor barrier, can be determined by peel test specimens being produced by a method based on DIN EN 1939:2003 on moist fibrocement sheets and these being subjected to accelerated aging in the moist state at elevated temperature. The storage time should for this purpose be matched to the period of use expected.

The first pressure-sensitive adhesive layer therefore also has a peel resistance measured by a method based on DIN EN 1939:2003 of ≥3.0 N/25 mm, preferably ≥6.0 N/25 mm, after accelerated aging on a moisture-saturated fibrocement sheet for 20 days, preferably for 28 days, more preferably for 41 days, at 50° C. with retention of the moisture content. Here, the test specimens are likewise produced in accordance with DIN EN 1939:2003, with these then being aged for 20 days, preferably for 28 days, more preferably for 41 days, at 50° C. with retention of the moisture content. The storage or aging for 20 days, preferably for 28 days, more preferably for 41 days, at 50° C. with retention of the moisture content here models a long-term action of moisture. Retention of the moisture content ensures that the fibrocement sheet and also further constituents of the test specimen do not dry out and the moisture saturation of the fibrocement sheet is retained and can be ensured in a suitable way, for example by appropriate after-moistening and/or storage in a closed room having a controlled humidity. After aging, the peel resistance is again tested by the methods described in DIN EN 1939:2003.

In particular embodiments, the peel resistance does not decrease during the accelerated aging on a moisture-saturated fibrocement sheet for 20 days, preferably for 28 days, more preferably for 41 days, at 50° C. with retention of the moisture content compared to the point in time of the measurement after application, for example 15 minutes after application, to a moisture-saturated fibrocement sheet.

On mineral substrates, for example concrete, cement screed, cement-based troweling compositions, etc., both the surface and the migrating moisture can be alkaline. pH values in the range from 8.0 to 13.5 are quite normal and occur in practice. The pH values of the surfaces or of migrating moisture can be measured by means of a suitable pH test strip in accordance with ASTM F710-11, paragraph 5.2 (ASTM F710-11, Standard Practice for Preparing Concrete Floors to Receive Resilient Flooring, ASTM International, West Conshohocken, PA, 2011).

In particular, the first pressure-sensitive adhesive layer therefore also has a sufficient resistance to alkaline moisture. In particular embodiments, the first pressure-sensitive adhesive layer is therefore resistant to alkaline moisture having a pH of equal to or more than 8.0 and equal to or less than 13.5, preferably equal to or more than 8.5 and equal to or less than 13.0. The resistance is advantageously present both at the beginning of application or laying and also after aging, so that the first pressure-sensitive adhesive layer thus has a peel resistance measured by a method based on DIN EN 1939:2003 of ≥3.0 N/25 mm, preferably ≥6.0 N/25 mm, after application to a moisture-saturated fibrocement sheet at a pH of equal to or more than 8.0 and equal to or less than 13.5, preferably equal to or more than 8.5 and equal to or less than 13.0, and/or the first pressure-sensitive adhesive layer has a peel resistance measured by a method based on DIN EN 1939:2003 of ≥3.0 N/25 mm, preferably ≥6.0 N/25 mm, after accelerated aging on a moisture-saturated fibrocement sheet for 20 days, preferably for 28 days, more preferably for 41 days, at 50° C. with retention of the moisture content at a pH of equal to or more than 8.0 and equal to or less than 13.5, preferably equal to or more than 8.5 and equal to or less than 13.0. The alkalinity in the range from pH 8.0 to 13.5 can, for example, be achieved by moistening of fibrocement sheets with deionized water. If required, the pH can be set in a targeted manner by addition of dilute sodium hydroxide solution.

Here too, preference is given to the peel resistance not decreasing during aging.

Since the first pressure-sensitive adhesive layer comes into contact with the substrate containing residual moisture during laying and therefore, viewed from the substrate containing residual moisture, is located in the self-adhesive vapor barrier according to the invention below or under the carrier film, it can also be referred to as lower pressure-sensitive adhesive layer. Correspondingly, the second pressure-sensitive adhesive layer can be referred to as upper pressure-sensitive adhesive layer since it is located at the top in the self-adhesive vapor barrier of the invention or above the carrier film.

In respect of the first pressure-sensitive adhesive layer, the expression "facing the surroundings" means that there is no optional removable covering layer and there is no longer any further adjoining layer which belongs to the self-adhesive vapor barrier according to the invention but instead the first pressure-sensitive adhesive layer forms a surface of the self-adhesive vapor barrier of the invention. Of course, this first pressure-sensitive adhesive layer can during further processing of the self-adhesive vapor barrier, for example during laying, come into contact with the substrate which then forms the surroundings. The surroundings thus do not necessarily have to be air.

The first pressure-sensitive adhesive layer is not subject to any particular restrictions in respect of its configuration and can also be matched to a substrate containing residual moisture on which the self-adhesive vapor barrier of the invention is to be laid by being, for example, flat or structured.

In particular embodiments, the first pressure-sensitive adhesive layer has an adhesive application mass of 10-100 g/m², with this being able to be, in particular embodiments, 20-80 g/m² or 30-70 g/m², for example depending on the field of application and substrate.

The material of the first pressure-sensitive adhesive layer is not subject to particular restrictions, as long as it brings about the appropriate moisture resistance of the first pressure-sensitive adhesive layer and adheres to a preferably mineral substrate containing residual moisture, and can also encompass mixtures of materials. In particular embodiments, the first pressure-sensitive adhesive layer is present as hot-melt adhesive, solvent-based adhesive or dispersion adhesive, preferably as hot-melt adhesive or solvent-based adhesive, particularly preferably as hot-melt adhesive, which are made purely physically curing and/or chemically and/or physically post-crosslinking.

In particular embodiments, the first pressure-sensitive adhesive layer can consist of or comprise a pressure-sensitive adhesive material selected from the group consisting of pressure-sensitive adhesives based on rubber, natural rubber, synthetic rubber such as styrene-butadiene block copolymers (SBS), acrylate, chloroprene rubber, polyurethane, styrene-acrylate, vinyl acetate, vinyl acetate-ethylene, vinyl versatate, polyethylene-vinyl acetate, polyethylene-vinyl versatate, polyacrylate, and/or mixtures and/or copolymers thereof, preferably pressure-sensitive adhesives based on rubber, natural rubber, synthetic rubber such as SBS block copolymers, polyurethane, polyacrylate, polyethylene-vinyl acetate, polyethylene-vinyl versatate and/or mixtures and/or copolymers thereof, particularly preferably pressure-sensitive adhesives based on rubber, natural rubber, synthetic rubber such as SBS block copolymers, chloroprene rubber and/or mixtures and/or copolymers thereof, with preference again being given to hot-melt adhesives (hot melts) and/or solvent-based adhesives.

In addition to the first pressure-sensitive adhesive layer, the self-adhesive vapor barrier according to the invention further comprises at least one carrier film. The carrier film can here be configured in the form of a single-layer or multilayer film having two or more layers or else as composite material.

In particular embodiments, the carrier film comprises one or more, for example one, film carrier(s) onto which one or more different layers such as the first pressure-sensitive adhesive layer, one or more moisture barrier layers, for example one moisture barrier layer and/or a second pressure-sensitive adhesive layer can be applied, where the first pressure-sensitive adhesive layer and the second pressure-sensitive adhesive layer can be configured as separate layers in relation to the carrier film, but the moisture barrier layer can again also be joined as part of the carrier film with the film carrier or another layer in a multilayer composite, i.e. be integrated into the carrier film or be part of the carrier film. In particular embodiments, the carrier film consists of one or more, for example one, film carrier(s). In particular embodiments, the film carrier itself can also, so that it functions as moisture barrier, be provided as moisture barrier layer, i.e. can function both as carrier film and as moisture barrier layer. In particular embodiments, film carrier and moisture barrier layer are different.

The material of the film carrier is not subject to any particular restrictions as long as the further layers can be applied. For example, the film carrier can be configured as metal foil or metal layer or polymer film. As polymer, the material can also be foamed. In particular embodiments, the film carrier or the carrier film consists of a polymer material.

The polymer of the film carrier or the carrier film is not subject to any particular restrictions here and can, for example, comprise polymer materials or consist of polymer materials selected from the group consisting of polyethylene (PE), polypropylene (PP), aromatic and/or aliphatic polyamides (PA), aliphatic and/or aromatic polyesters (PES), polyethylene-propylene (PEP), polyethylene terephthalate (PET), polylactide (PLA), polymethyl methacrylate (PMMA), polyolefins (PO), polyvinyl butyral (PVB), polybutadiene, neoprene, latex, nitrile rubber (NBR), styrene-butadiene rubber (SBR), polyvinyl chloride (PVC), polycarbonate (PC), polyacrylic ester (PAA), polyacrylonitrile (PAN), polyamidimide (PAI), polybutyl acrylate (PBA), polyesteramide (PEA), polyetherimide (PEI), polyether ketone (PEK), polyether carbonate (PEC), polyimide (PI), polyacrylic ester imide, for example polymethacrylic methylimide (PMMI), polyoxymethylene (POM), polyphenylvinyl (PPV), polystyrene (PS), polyurethane (PUR), polyvinyl acetate (PVAC), polyvinyl alcohol (PVOH), polyvinyl fluoride (PVF) or copolymers and/or mixtures thereof, preferably from the group consisting of polyethylene (PE), polypropylene (PP), aromatic and/or aliphatic polyamides (PA), aliphatic and/or aromatic polyesters (PES), polyethylene-propylene (PEP), polyethylene terephthalate (PET), polylactide (PLA), polyacrylonitrile (PAN), polymethyl methacrylate (PMMA), polyolefins (PO), polyvinyl butyral (PVB), polybutadiene, neoprene, latex and/or polyvinyl chloride (PVC) and/or copolymers and/or mixtures thereof. In particular embodiments, the film carrier or the carrier film comprises polyethylene (PE), polypropylene (PP), polyethylene-propylene (PEP), polyolefins (PO), polyvinyl chloride (PVC), polyacrylonitrile (PAN), latex, nitrile rubber (NBR) and/or styrene-butadiene rubber (SBR) and/or copolymers and/or mixtures thereof and/or consists thereof.

If a foam is used or concomitantly used for the film carrier or the carrier film or a layer in a multilayer carrier film, the foam preferably consists of a polymer material from the group consisting of polyethylene (PE), polypropylene (PP), aromatic and/or aliphatic polyamides (PA), aliphatic and/or aromatic polyesters (PES), polyethylene-propylene (PEP), polyether, polyurethane, polyethylene terephthalate (PET), polylactide, polyolefins, polyvinyl butyral, polybutadiene, neoprene, latex and/or polyvinyl chloride and/or copolymers and/or mixtures thereof.

If, for example, the material of the film carrier or the carrier film and/or a pressure-sensitive adhesive layer is sensitive to plasticizers, the self-adhesive vapor barrier according to the invention further comprises, in particular embodiments, at least one barrier layer which is impermeable to plasticizers. In particular embodiments, the self-adhesive vapor barrier according to the invention further comprises at least one barrier layer which is impermeable to plasticizers. A plurality of barrier layers for plasticizers being present is not ruled out. Such a barrier layer to plasticizers is preferably located on one side of the self-adhesive vapor barrier from which introduction of plasticizer is to be feared or to be expected after laying and processing of the self-adhesive vapor barrier, i.e., for example, from the upper side from various floor coverings, which corresponds to the side on which the second pressure-sensitive adhesive layer is applied. If plasticizer introduction from the direction of the floor is to be feared, a barrier layer which is impermeable to plasticizers can also be arranged on the film carrier or the carrier film in the direction of the first pressure-sensitive adhesive layer. A barrier layer which is impermeable to plasticizers is here preferably a layer which does not allow any plasticizer to pass through.

The material of the barrier layer which is impermeable to plasticizers is not subject to any particular restrictions here as long as it prevents passage of plasticizers and is, for example, polymeric, metallic and/or ceramic, i.e. comprises one or more polymers, metals and/or ceramics and/or consists thereof. As barrier layer which is impermeable to plasticizers, it is possible to employ, for example, a layer which contains a metal, a metal oxide and/or a polymer encompassing polyethylene terephthalate (PET), aromatic and/or aliphatic polyamides (PA), aliphatic and/or aromatic polyesters (PES), polymethyl methacrylate (PMMA), polyacrylonitrile (PAN), polyvinyl chloride (PVC), polycarbonate (PC), polyurethane (PUR), polyvinyl acetate (PVAC), polyvinyl alcohol (PVOH) and/or copolymers and/or mixtures thereof, preferably polyethylene terephthalate (PET), aromatic and/or aliphatic polyamides (PA), polyacrylonitrile (PAN), polyvinyl alcohol (PVOH) and/or polymethyl methacrylate (PMMA) and/or copolymers and/or mixtures thereof, and/or consists thereof.

In particular embodiments, the at least one barrier layer which is impermeable to plasticizers is a polymer layer which has a thickness of from 1 to 200 µm and/or a metal or metal oxide layer which has a thickness of from 10 nm to 100 µm, preferably a polymer layer which has a thickness of from 10 µm to 150 µm, preferably from 15 to 100 µm, more preferably from 20 to 60 µm, and/or a metal or metal oxide layer which has a thickness of from 15 nm to 50 µm, preferably 20 nm-30 µm.

In particular embodiments, the at least one moisture barrier layer and/or the optional at least one barrier layer which is impermeable to plasticizers is/are integrated into the carrier film. They can thus, for example, have been applied to the film carrier and/or another layer in a multilayer structure of the carrier film, or the film carrier can perform one or both functions, i.e. the plasticizer barrier and/or the barrier to moisture. Thus, the carrier film can contain at least one plasticizer-blocking layer, i.e. a barrier layer which is impermeable to plasticizers, in particular a layer which has a barrier action in respect of organic substances which are capable of migration, and/or at least one moisture barrier layer, in particular a layer which has a barrier action in respect of water vapor.

In the self-adhesive vapor barrier of the invention, a second pressure-sensitive adhesive layer and thereabove a removable covering layer is present above the carrier film on a side of the self-adhesive vapor barrier facing the surroundings on the side opposite the first pressure-sensitive adhesive layer. On laying on the substrate, this corresponds to the upper side of the self-adhesive vapor barrier. Here, the expression "facing the surroundings" means that there is no longer any further adjoining layer which belongs to the self-adhesive vapor barrier according to the invention but instead this forms a surface of the self-adhesive vapor barrier according to the invention, i.e., for example, the removable covering layer or, after removal thereof in the process of the invention, the second pressure-sensitive adhesive layer. The self-adhesive vapor barrier according to the invention thus additionally comprises a second pressure-sensitive adhesive layer which is present on a side of the carrier film opposite the first pressure-sensitive adhesive layer. If no removable covering layer is present on this second pressure-sensitive adhesive layer, the second pressure-sensitive adhesive layer faces the surroundings. If a removable covering layer is present on the second pressure-sensitive adhesive layer, this faces the surroundings.

Of course, the second pressure-sensitive adhesive layer, after removing the removable covering layer, can in turn be covered in further processing of the self-adhesive vapor barrier, for example with a floor covering, so that the surroundings here do not have to be only air. Likewise, this layer, for example the removable covering layer, can, in a rolled-up state of the self-adhesive vapor barrier, be at least partly opposite the first pressure-sensitive adhesive layer in the roll, but it preferably does not bond to the latter and on unrolling of the self-adhesive vapor barrier becomes detached again from the first pressure-sensitive adhesive layer.

In particular embodiments, the second pressure-sensitive adhesive layer, which can also be referred to as upper pressure-sensitive adhesive layer since it is located at the top viewed from the substrate containing residual moisture during laying and is located above the carrier film relative to the first pressure-sensitive adhesive layer, is resistant to influences of materials from floor coverings which during laying are applied thereon and joined thereto, for example to plasticizers. Due to its position at the top during laying, the upper surface thereof, facing away from the carrier film, faces a rear side of a floor covering to be laid.

The second pressure-sensitive adhesive layer is not subject to any particular restrictions in respect of the nature of its surface and can, for example, be matched to a floor covering to be laid. It can, for example, be flat or structured.

In particular embodiments, the second pressure-sensitive adhesive layer has an adhesive application mass of 10-200 g/m$^2$, preferably 20-150 g/m$^2$, particularly preferably 30-100 g/m$^2$.

The material of the second pressure-sensitive adhesive layer is not subject to any particular restrictions as long as it can be joined and adhesively bonded to a floor covering to be laid. The second pressure-sensitive adhesive layer can, for example, consist of pressure-sensitive adhesives based on acrylate, chloroprene rubber, polyurethane, styrene-acrylate, vinyl acetate, vinyl acetate-ethylene, vinyl versatate and/or mixtures thereof and/or copolymers thereof or comprise these, with these adhesives preferably being present as dispersion adhesives, solvent-based adhesives and/or hot-melt adhesives and being made, for example, purely physically curing and/or chemically and/or physically post-crosslinking.

In addition, the self-adhesive vapor barrier according to the invention comprises a removable covering layer, for example a liner, which has been applied to the second pressure-sensitive adhesive layer on a side of the self-adhesive vapor barrier facing the surroundings opposite the carrier film. In this way, joining to the first pressure-sensitive adhesive layer can be prevented when the self-adhesive vapor barrier is rolled up. The second pressure-sensitive adhesive layer is also protected from dust thereby. In addition, in order to protect against dust, it is naturally also possible for the first pressure-sensitive adhesive layer to be provided with a removable covering layer which can be provided on the side of the first pressure-sensitive adhesive layer facing the surroundings, particularly in the case of a plate shape of the self-adhesive vapor barrier according to the invention. The removable covering layer or removable covering layers, if two or more are present, are, in particular embodiments, provided with antiadhesion coatings on both sides, which is particularly advantageous when only one removable covering layer is present and this is rolled up, in order not to adhere to the two (first and second) pressure-sensitive adhesive layers, with, for example, the adhesion of the removable covering layer to the first pressure-sensitive adhesive layer being able in this case to be lower. When two or more removable covering layers are present, these can also be provided with antiadhesion coatings on one side.

In addition, a removable covering layer, for example an adhesion-reducing covering layer, which is not subject to any particular further restrictions as long as it is removable and has been made, in particular, adhesion-reducing, can, as indicated above, be provided on the first pressure-sensitive adhesive layer. In the case of an adhesion-reducing, removable covering layer which can be provided on the second and/or first pressure-sensitive adhesive layer, a measurement of the peel resistance, made by a method based on DIN EN 1939:2003, between the removable covering layer and the first and/or second pressure-sensitive adhesive layer can, for example, give values of ≤5.0 N/25 mm, preferably ≤3.0 N/25 mm, particularly preferably ≤1.5 N/25 mm.

In particular embodiments, the self-adhesive vapor barrier of the invention further comprises a removable covering layer which has been applied to the second pressure-sensitive adhesive layer on a side of the self-adhesive vapor barrier facing the surroundings opposite the carrier film, wherein this has an adhesion with respect to the first and/or second pressure-sensitive adhesive layer, measured by a method based on DIN EN 1939, of ≤5.0 N/25 mm, preferably ≤3.0 N/25 mm, particularly preferably ≤1.5 N/25 mm.

The self-adhesive vapor barrier of the invention additionally comprises at least one moisture barrier layer, for example a layer which blocks moisture, and can also comprise a plurality of barrier layers and/or layers which block moisture.

In particular embodiments, the moisture barrier layer has an $s_D$ value, measured in accordance with ASTM E 398-13, of at least 50 m, preferably at least 100 m, more preferably at least 200 m. A layer which blocks moisture has, for example, in particular an $s_D$ value, measured in accordance with ASTM E 398-13, of at least 1500 m.

The at least one moisture barrier layer is not subject to any particular restrictions as long as it acts as barrier to moisture and can be, for example, polymeric, metallic and/or ceramic, for example a metal oxide layer.

Suitable metals are, for example, Al, Cu, Ag, Au, Ti, Cr, Ni, Pd and/or Pt, for example Al, Ag, Au, Pd and/or Cu, in particular Al and/or Cu, which can be provided as foil and/or can be present as coating, for example vapor-deposited.

Suitable metal oxides are, for example, aluminum oxide, silicon dioxide, titanium oxide, etc., or mixed oxides; with aluminum oxide, silicon oxide, aluminum-silicon oxide being particularly suitable.

The at least one moisture barrier layer can as polymer comprise, for example, a material, or consist of a material, which is selected from the group consisting of polypropylene (PP), polyethylene (PE), polyolefins (PO), latex, nitrile rubber (NBR), styrene-butadiene rubber (SBR), polycarbonate (PC), polyvinyl chloride (PVC), polyvinyl acetate (PVAC), polyurethane (PU) and/or copolymers and/or mixtures thereof, more preferably polypropylene (PP), polyethylene (PE), polyolefins (PO), latex, nitrile rubber (NBR), styrene-butadiene rubber (SBR), polyvinyl chloride (PVC) and/or copolymers and/or mixtures thereof.

In particular embodiments, the at least one moisture barrier layer and/or the optional barrier layer for plasticizers is/are a polymer layer composed of polymer material. As indicated above, the moisture barrier layer and/or barrier layer to plasticizers can, in particular embodiments, be integrated into the carrier film.

When the moisture barrier layer is provided as polymer layer, this has, according to particular embodiments, a thickness in the range from 10 μm to 1000 μm, preferably in the range from 20 μm to 500 μm, more preferably in the range from 50 μm to 300 μm. This gives a particular stability both in a mechanical respect and also in respect of barrier action against moisture when a polymer layer is used as moisture barrier layer. In the case of metals or metal oxides, the thickness of the moisture barrier layer is, according to particular embodiments, in a thickness range from 10 nm to about 100 µm.

When the barrier layer against plasticizers is provided as polymer layer, this has, according to particular embodiments, a thickness in the range from 1 µm to 200 µm, preferably in the range from 10 µm to 150 µm, more preferably in the range from 15 to 100 µm, even more preferably from 20 to 60 µm. When the barrier layer against plasticizers is provided as metal layer or metal oxide layer, this has, according to particular embodiments, a thickness of from 15 nm to 50 µm, preferably ≥20 nm-30 µm.

It is also conceivable for the carrier film to consist solely of a metallic vapor barrier and optionally plasticizer barrier which, according to particular embodiments, has a thickness of from 10 to 500 µm, preferably from 20 to 200 µm, more preferably from 30 to 100 µm.

In particular embodiments, the self-adhesive vapor barrier of the invention has a vapor barrier action or barrier action against moisture having an $s_D$ value, measured in accordance with ASTM E 398-13, of at least 50 m, preferably at least 100 m, more preferably at least 200 m, even more preferably at least 500 m, particularly preferably at least 1500 m.

The self-adhesive vapor barrier according to the invention can be produced in various forms, for example in roll form, as strip or as plate, which can then be used suitably in the method of the invention. According to particular embodiments, the self-adhesive vapor barrier of the invention is produced in roll form.

In particular embodiments, the at least one moisture barrier layer is located between the at least one carrier film and the first pressure-sensitive adhesive layer and/or is in contact with the first pressure-sensitive adhesive layer. This is particularly advantageous when the carrier film is moisture-sensitive. There is, for example, the sequence of first pressure-sensitive adhesive layer/moisture barrier layer/carrier film/second pressure-sensitive adhesive layer with optional removable covering layer. A barrier layer against plasticizers can here be provided, for example between the second pressure-sensitive adhesive layer and the carrier film, integrated into the carrier film, between the moisture barrier layer and the carrier film, and/or the first pressure-sensitive adhesive layer and the moisture barrier layer, with appropriate account being able to be taken here of the resistance of the materials of the respective layer to plasticizers. It is also possible to provide a plurality of moisture barrier layers and/or carrier films and/or barrier layers against plasticizers. Furthermore, it is also conceivable for the moisture barrier layer also to act as barrier layer against plasticizers or for the carrier film to act as moisture barrier layer and/or barrier layer against plasticizers.

In particular embodiments, the moisture barrier layer can also be present on or integrated into the carrier film, on a side facing away from the first pressure-sensitive adhesive layer, for example when the carrier film is not moisture-sensitive. There is then, for example, the sequence of first pressure-sensitive adhesive layer/carrier film/moisture barrier layer/second pressure-sensitive adhesive layer with removable covering layer; or first pressure-sensitive adhesive layer/carrier film with integrated moisture barrier layer/second pressure-sensitive adhesive layer with removable covering layer. A barrier layer to plasticizers can here be provided, for example between the second pressure-sensitive adhesive layer and the moisture barrier layer, integrated into the carrier film, between the moisture barrier layer and the carrier film, and/or the first pressure-sensitive adhesive layer and the carrier film, with appropriate account likewise being able to be taken here of the resistance of the materials of the respective layer to plasticizers. Once again, a plurality of moisture barrier layers and/or carrier films and/or barrier layers to plasticizers can also be provided. Furthermore, it is again conceivable for the moisture barrier layer also to act as barrier layer to plasticizers or for the carrier film to act as moisture barrier layer and/or barrier layer to plasticizers.

In addition, the present invention provides for the use of the self-adhesive vapor barrier of the invention for laying on a substrate containing residual moisture. Here, the vapor barrier can have a nature as is described in connection with the first aspect of the invention and thus also encompasses all embodiments presented there. In addition, the self-adhesive vapor barrier of the invention can be used for sealing a substrate containing residual moisture.

In particular embodiments, the substrate containing residual moisture is, in the case of the use according to the invention and also in the method of the invention, a residually moist substrate, for example having a mineral, preferably cement, basis, which has a residual moisture content which is above the values indicated in SIA 253:2002 (SIA Zurich), page 12, point 5.1.5.

Depending on the floor covering to be laid, the substrate moisture content has to be below particular limit values in order to achieve the readiness for laying. According to applicable rules in the field, for example in accordance with TKB information sheet 8, CM values of ≤2.0 CM-% have to be adhered to for readiness for covering in cement screeds for unheated surfaces and ≤1.8 CM-% for heated surfaces.

Substrates, for example mineral substrates, in particular cement-based substrates, which have higher moisture contents are considered in this sense to be "moist" or "residually moist".

For example, cement screeds have to have, according to applicable rules in the field, or according to general interpretation of DIN 18365:2006, a moisture content of not more than 2.0 CM-% for the laying of elastic floor coverings.

In particular embodiments, the substrate containing residual moisture is a residually moist substrate having a mineral basis and a residual moisture content of more than 1.8 CM-%, preferably more than 2.0 CM-%, more preferably more than 2.5 CM-%, even more preferably more than 3.0 CM-%, particularly preferably equal to or more than 4.0 CM-%, measured in accordance with SIA 253:2002, calcium carbide method (CM), pages 16-17. With regard to the measurement, reference may also be made to the Technische Kommission Boden (TKB) des Industrieverbands Kleben, TKB information sheet 8, TKB information sheet 16 and also BEB (Bundesverband Estrich & Belag) technical information January 1998. Here, a substrate having a mineral basis is, for example, a cement screed and/or a concrete slab, etc. In particular embodiments, the substrate is, for example, not based on linoleum, a polymeric material, metal, gypsum and/or wood, for example parquetry, in particular not based on linoleum, a polymeric material, metal and/or wood.

In particular embodiments, the substrate containing residual moisture is a residually moist substrate having a mineral basis and a residual moisture content of not more than 6.0 CM-%, for example not more than 5.0 CM-%. It is also quite possible to seal cement screeds having a higher moisture content as long as they are fully set and able to withstand mechanical loads.

In a further aspect, the present invention provides a method for applying a moisture barrier layer to a substrate containing residual moisture, comprising:

application of the above-described self-adhesive vapor barrier according to the invention to the substrate containing residual moisture, wherein the first pressure-sensitive adhesive layer is applied to the substrate containing residual moisture.

If a removable covering layer is provided on the first pressure-sensitive adhesive layer, this can be removed before application of the self-adhesive vapor barrier or during application of the self-adhesive vapor barrier according to the invention. If the self-adhesive vapor barrier according to the invention is rolled up and a removable covering layer is present between the first and second pressure-sensitive adhesive layers, this is preferably removed from the first pressure-sensitive adhesive layer, for example during unrolling, but is preferably left on the second pressure-sensitive adhesive layer, for example for protection against dust. After application of the self-adhesive vapor barrier according to the invention, it is possible, in particular embodiments, for, for example, a floor covering to be laid to be awaited before the removable covering layer is removed from the second pressure-sensitive adhesive layer, whereupon the covering layer is removed and the floor covering can be adhesively bonded and pressed on.

The application to the substrate here corresponds to laying, preferably with bonding or adhesion occurring between the substrate containing residual moisture and the first pressure-sensitive adhesive layer of the self-adhesive vapor barrier, which leads to fastening of the self-adhesive vapor barrier to the substrate.

The self-adhesive vapor barrier of the invention can also be used in the method of the invention in all embodiments mentioned in conjunction with the first aspect in any possible combinations, with preferred embodiments of the method, and also of the use according to the invention, arising from preferred embodiments of the self-adhesive vapor barrier.

The definition of the substrate containing residual moisture corresponds to the definition in connection with the use according to the invention.

According to particular embodiments, the substrate containing residual moisture is a residually moist substrate having a mineral basis, for example a cement-based substrate, and having a residual moisture content of more than 1.8 CM-%, preferably more than 2.0 CM-%, more preferably more than 2.5 CM-%, even more preferably more than 3.0 CM-%, particularly preferably equal to or more than 4.0 CM-%, measured in accordance with SIA 253:2002.

In particular embodiments, a plurality of self-adhesive vapor barriers according to the invention are applied in an overlapping manner. Passage of moisture at the overlap positions or connecting places can be reduced or prevented in this way. In order to minimize unevennesses, the overlap can here be very small and/or very thin.

In particular embodiments, a plurality of self-adhesive vapor barriers according to the invention are applied so as to adjoin one another and after the, for example partial, stripping away of the removable covering layers at the adjoining places are joined using at least one one-sided and/or two-sided, for example one-sided, self-adhesive tape and/or at least one one-sided and/or two-sided, for example one-sided, self-adhesive tape is applied to the substrate containing residual moisture underneath the adjoining places of the self-adhesive vapor barriers according to the invention and the self-adhesive vapor barriers according to the invention are applied on top of the at least one one-sided and/or two-sided self-adhesive tape, so that the adjoining places of the self-adhesive vapor barriers according to the invention are located above the one-sided and/or two-sided self-adhesive tape, with the at least one one-sided and/or two-sided self-adhesive tape having at least one moisture barrier layer. In such embodiments, too, the area and/or thickness of the self-adhesive tape is preferably very small in order to minimize unevennesses.

Adjoining application here is, for example, application in an abutting manner with avoidance of overlaps, and joins through which residual moisture in the substrate can penetrate can be formed here. In order to prevent this, the one-sided or two-sided self-adhesive tapes are used. The one-sided and/or two-sided self-adhesive tapes preferably have a pressure-sensitive adhesive layer which is applied onto the substrate containing residual moisture and/or the self-adhesive vapor barrier of the invention, with this pressure-sensitive adhesive layer preferably corresponding in terms of its material to the first and/or second pressure-sensitive adhesive layer of the self-adhesive vapor barrier of the invention.

When a one-sided self-adhesive tape is applied to the substrate containing residual moisture and the self-adhesive vapor barrier of the invention is applied on top of this, the one-sided self-adhesive tape preferably has, as pressure-sensitive adhesive layer, a layer of this type which corresponds to the first pressure-sensitive adhesive layer of the self-adhesive vapor barrier of the invention, with this pressure-sensitive adhesive layer preferably being applied to the substrate containing residual moisture. If a one-sided self-adhesive tape is applied to the self-adhesive vapor barrier according to the invention, the pressure-sensitive adhesive layer preferably corresponds to the second pressure-sensitive adhesive layer of the self-adhesive vapor barrier according to the invention, with the nonadhesive side of the one-sided self-adhesive tape preferably being applied to the self-adhesive vapor barrier according to the invention, so that the pressure-sensitive adhesive layer faces a floor covering to be laid. In the case of a two-sided self-adhesive tape, the pressure-sensitive adhesive layer analogously corresponds, in particular embodiments, to the first pressure-sensitive adhesive layer which is preferably applied to the substrate containing residual moisture and/or the other pressure-sensitive adhesive layer corresponds to the second pressure-sensitive adhesive layer of the self-adhesive vapor barrier according to the invention and the self-adhesive tape is preferably applied to the self-adhesive vapor barrier according to the invention in such a way that this, other, pressure-sensitive adhesive layer is located opposite a floor covering to be laid.

The one-sided and/or two-sided self-adhesive tapes preferably also comprise at least one moisture barrier layer which corresponds to those of the self-adhesive vapor barrier of the invention. They can additionally also contain at least one barrier layer against plasticizers.

In particular embodiments, the one-sided or two-sided self-adhesive tape is, in order to save material, only applied underneath the adjoining places or only above the self-adhesive vapor barriers of the invention; it is naturally also possible in the case of application of more than two self-adhesive vapor barriers according to the invention for the self-adhesive tape to be applied at one or more adjoining places underneath the self-adhesive vapor barriers according to the invention and to be applied on or above this at one or more other adjoining places to join the self-adhesive vapor barriers according to the invention.

Using both one-sided or two-sided self-adhesive tapes, for example above and/or underneath the self-adhesive vapor barriers according to the invention, and overlapping of the self-adhesive vapor barriers according to the invention additionally taking place is not ruled out according to the invention, but this is not necessarily preferred in respect of avoiding greater unevennesses and increased consumption of material. When the self-adhesive vapor barrier of the invention is laid on partial areas or patches, it is optionally also possible to dispense with one-sided or two-sided self-adhesive tapes. In particular, one-sided self-adhesive tapes are used in the case of a residual moisture content of the substrate of 2.5 CM-% or more, preferably 3.0 CM-% or more, and/or the self-adhesive vapor barriers according to the invention are applied in an overlapping manner.

In particular embodiments, the at least one moisture barrier layer of the at least one one-sided and/or two-sided self-adhesive tape has an $s_D$ value, measured by a method based on ASTM E 398-13, of at least 50 m, preferably at least 100 m, more preferably at least 200 m.

In particular embodiments, an $s_D$ value, measured by a method based on ASTM E 398-13, in each case of at least 20 m, preferably at least 50 m, more preferably at least 100 m, is attained at adjoining places sealed by means of tapes, for example joins, of two or more self-adhesive vapor barriers according to the invention.

In particular embodiments, the method of the invention comprises pulling-off of the removable covering layer on the second pressure-sensitive adhesive layer after application of the self-adhesive vapor barrier to the substrate and, in particular embodiments, application of a floor covering on top of the second pressure-sensitive adhesive layer, with the floor covering being able to be awaited beforehand. A floor covering being applied and the removable covering layer being removed at the same time or shortly thereafter is also not ruled out.

For the method, the substrate preferably has sufficient flatness and a sufficiently low roughness for a floor covering to be installed. In particular embodiments, the substrate is therefore prepared, for example by scraping flat and/or by grinding flat and/or by means of a moisture-resistant troweling composition, which is not subject to any restrictions apart from the moisture resistance, before application of the self-adhesive vapor barrier according to the invention. The moisture resistance here again has a meaning analogous to that in respect of the first pressure-sensitive adhesive layer, this means that the strength of the troweling composition used satisfies the general requirements for the strength of troweling compositions under ongoing action of moisture or the strength thereof does not decrease under prolonged action of moisture.

The requirements in respect of flatness or evenness can be taken, for example, from the rules for the field, for example as set forth in TKB information sheet 8, or the following standards, for example DIN 18202:2005, table 3, lines 3 and 4, for example DIN 18365:2012, paragraphs 3.2 and 3.3, etc. The evenness can, for example, be measured in accordance with the methods of DIN 18202:2005. However, according to TKB information sheet 8, point 4.3, these limit values are not always sufficient, so that the requirements in respect of evenness and flatness indicated by the respective covering manufacturer may have to be adhered to.

In particular embodiments, the substrate containing residual moisture has an evenness which corresponds at least to the requirements of DIN 18202:2005, table 3, line 3, preferably line 4. The values are in part reported in table 1 below.

TABLE 1

Extract from DIN 18202:2005-10, table 3, line 3

| | Measured depths as limit values in mm at measurement point spacings in m up to | | | | | |
|---|---|---|---|---|---|---|
| Line | 0.1 | 1 | 4 | 10 | 15* | [m] |
| 3 | 2 | 4 | 10 | 12 | 15 | [mm] |
| 4 | 1 | 3 | 9 | 12 | 15 | [mm] |

*The limit values for evenness deviations in this column also apply to measurement point spacings above 15 m As floor coverings which can be applied to the self-adhesive vapor barrier of the invention, possibilities are, for example, rubber floor coverings, homogeneous PVC floor coverings, heterogeneous PVC floor coverings, coverings bearing designs, CV (cushioned vinyl, foamed floor coverings made of PVC) floor coverings, caulk coverings, linoleum coverings, enomer coverings, Flotex, possibly tufted textile coverings with nonwoven backing, synthetic double backing (SDR), foam or textile backings and also ball yarn, PP needled nonwoven coverings such as Finett 7, etc.

The above embodiments, configurations and further developments can, if meaningful, be combined with one another in any way. Further possible embodiments, further developments and implementations of the invention also encompass combinations which are not explicitly mentioned of features of the invention described above or in the following in the context of the working examples. In particular, a person skilled in the art will also add individual aspects as improvements or supplements to the respective basic form of the present invention.

The invention will now be presented with the aid of some illustrative embodiments which, however, do not restrict the invention.

Preliminary Tests

Various test specimens having an identical carrier film and different first pressure-sensitive adhesive layers or adhesives with an adhesive application mass of 10-200 g/m$^2$ were produced.

As adhesives, use was made of a dispersion-based polyacrylate as acrylate 1 (Vinnapas EAF 67, 2016), a polyacrylate hot melt as acrylate 2 (AC Resin A 204, 2016), a further polyacrylate hot melt as acrylate 3 (AC Resin A 250, 2016), a rubber hot-melt adhesive as SBS 1 (Artimelt T 231, 2016), a rubber hot-melt adhesive as SBS 2 (Novamelt PS 2050, 2016) and a further rubber hot-melt adhesive as SBS 3 (Novamelt PS 5020, 2016). Acrylate 1 is a polyacrylate dispersion, acrylate 2 and 3 are polyacrylate hot melts which are obtainable as 100% systems and behave differently, and SBS 1-3 are rubber hot melts for which no indications of the material constituents are available. In addition, a blend of acrylate 2 (4 parts by weight) and acrylate 3 (3 parts by weight) was produced by mixing the two polyacrylate hot melts in the specified ratio, and this is referred to as acrylate 4.

The adhesives were selected here in such a way that the effect of the invention of adhesion of the self-adhesive vapor barrier both after laying and also after aging can, with regard to long-term adhesion, be demonstrated clearly in the following examples. However, the adhesives used here do not constitute a restriction of the invention, and it may be pointed out that polyacrylate-based pressure-sensitive adhesives which satisfy the parameters defined according to the invention, and also other pressure-sensitive adhesives which are neither rubber adhesives nor polyacrylate adhesives are also known. However, these will not be discussed further here since the effect of the invention can clearly be seen from the following examples and comparative examples, and corresponding results are achieved using corresponding further adhesives which likewise have the appropriate peel resistances.

The test specimens were applied to a moisture-saturated fibrocement sheet and joined to this by the method described in DIN EN 1939:2003. After 15 minutes, the peel resistance was measured by the method described in DIN EN 1939:2003.

A residually moist substrate which on actual laying of the self-adhesive vapor barrier according to the invention comes into contact with and is bonded to the latter can be simulated in this way. Adhesive forces on standard substrates such as steel (V2A) or glass are mostly reported on data sheets. It has been found that the measured values reported on the data sheets can serve merely as starting point for a rough selection of adhesives and these then have to be specifically tested.

A commercial, untreated fibrocement sheet was used as fiber cement sheet.

For comparison, a measurement of the peel resistance by the method described in DIN EN 1939:2003 was additionally carried out after application of the test specimen to steel and glass and also a dry fibrocement sheet and joining to the latter, likewise after 15 minutes. The peel test was carried out under standard conditions of temperature and humidity.

In addition, test specimens applied and joined in this way to the moisture-saturated fibrocement sheets were aged for 28 days at 50° C. with retention of the moisture content and the peel resistance was subsequently measured again by the method described in DIN EN 1939:2003.

The pH of the moisture-saturated fibrocement sheet was additionally measured using a pH strip in accordance with ASTM F710-11, paragraph 5.2, and a pH of about 13.0 was obtained.

While a similar behavior of the adhesives is often observed on the dry substrates steel and glass and also fibrocement, a quite different behavior is surprisingly often found on moist substrates. The measured values for the peel tests using a method based on DIN EN 1939:2003 after 15 minutes are shown in table 2.

TABLE 2

Measured values of the peel resistance after 15 minutes

|   | Adhesive | DIN steel [N/25 mm] | Glass [N/25 mm] | Fibrocement, dry [N/25 mm] | Fibrocement, moist [N/25 mm] |
|---|---|---|---|---|---|
| 1 | Acrylate 1 | 6.9 | 9.3 | 9.1 | 0.07 |
| 2 | Acrylate 2 | 11.1 | 15.7 | 21.9 | 0.27 |
| 3 | Acrylate 3 | 41.6 | 62.2 | 39.5 | 4.00 |
| 4 | SBS 1 | 43.5 | 44.7 | 13.9 | 0.15 |
| 5 | SBS 2 | 35.6 | 42.4 | 31.9 | 7.97 |
| 6 | SBS 3 | 17.8 | 19.6 | 18.0 | 7.89 |
| 7 | Acrylate 4 |   |   | 28.6 | 5.2 |

For different, dry substrates, it is at least possible to draw analogous conclusions in respect of the adhesion properties of substrate to substrate for an adhesive. However, the peel force measurements on standardized substrates do not make it possible to draw conclusions as to the behavior of the adhesives on substrates containing residual moisture, as can be seen from table 2.

Table 3 shows the results of the peel tests for the test specimens on moisture-saturated fibrocement sheets after a contact time of 15 minutes and after moist storage at 50° C. for 28 days, with analogous values also being obtained after 41 days. Resistant pressure-sensitive adhesive layers here preferably do not display any decrease in the adhesion forces.

TABLE 3

|   | Adhesive | Fibrocement, moist 15' [N/25 mm] | Fibrocement, moist 28 days 50° C. [N/25 mm] |
|---|---|---|---|
| 1 | Acrylate 1 | 0.07 | 2.3 |
| 2 | Acrylate 2 | 0.27 | 9.0 |
| 3 | Acrylate 3 | 4.00 | 0.67 |
| 4 | SBS 1 | 0.15 | 7.2 |
| 5 | SBS 2 | 7.97 | 17.2 |
| 6 | SBS 3 | 7.89 | 0.86 |
| 7 | Acrylate 4 | 5.2 | 3.6 |

15' = 15 Minutes

Which adhesives function for a project and which do not generally has to be assessed in each case with the aid of the project requirements. As minimum requirements, peel forces measured by a method based on DIN EN 1939:2003 of at least 3.0 N/25 mm should be achieved under all relevant conditions. This encompasses, for example, peel forces on both a dry fibrocement sheet and a moist fibrocement sheet and also on a moist fibrocement sheet after accelerated aging, at least after 20 days, preferably 28 days, more preferably 41 days, at 50° C. In addition, a decrease in peel force compared to 15 minutes should preferably not occur after accelerated aging.

In accordance with these requirements and from the measured data presented, it can be seen that acrylate 1 does not bring about satisfactory adhesion on a moist fibrocement sheet both after 15 minutes and also after accelerated aging. Acrylate 2 and SBS 1 have unsatisfactory initial adhesion to the moist fibrocement sheet and fail despite good values after accelerated aging. Acrylate 3 and SBS 3 display satisfactory short-term adhesion values on the moist fibrocement sheet, but are insufficiently resistant in a moist, alkaline medium. Satisfactory properties are displayed in this selection by SBS 2, with satisfactory adhesion values on a moist fibrocement sheet both after 15 minutes and also after accelerated aging after 20 days, preferably 28 days, more preferably 41 days, at 50° C. in an alkaline moist medium and also on dry substrates.

The peel force conditions are also satisfied by acrylate 4, which shows that the conditions can be satisfied not only with SBS or SIS copolymers.

EXAMPLE 1

When SBS 2 is used as first pressure-sensitive adhesive layer, it is possible to produce a self-adhesive vapor barrier according to the invention which is provided on an upper side of a film carrier composed of polyethylene, on which a for example 50 nm thick aluminum layer has been vapor deposited, with a pressure-sensitive adhesive layer, e.g. composed of polyacrylate, which is covered with a removable covering layer, and is provided on the other side of the film carrier with the first pressure-sensitive adhesive layer. Even after accelerated aging, the double-sided self-adhesive vapor barrier remains on a substrate containing residual moisture, even after the removable covering layer has been pulled off, and also a floor covering, for example a PVC floor, which has been applied thereto after removal of the covering layer.

A double-sided self-adhesive vapor barrier which can be adhesively bonded on top of residually moist, cement-based substrates which are dry on the surface, and onto which vapor barrier a floor covering can be directly adhesively bonded, is thus obtained. The carrier contains both a moisture barrier and a plasticizer barrier, the adhesive of the open side, i.e. the first pressure-sensitive adhesive layer, is designed for adhesive bonding on top of the substrate containing residual moisture and the adhesive of the closed side, i.e. the second pressure-sensitive adhesive layer, is designed for direct adhesive bonding of textile floor coverings and/or elastic floor coverings.

EXAMPLE 2 (COMPARATIVE EXAMPLE)

In a manner analogous to example 1, a self-adhesive vapor barrier was produced by applying a pressure-sensitive adhesive layer to a film carrier which is composed of polyethylene and has had an aluminum layer vapor deposited thereon and is provided with a pressure-sensitive adhesive layer, e.g. composed of polyacrylate, which is covered with a removable covering layer, on the other side of the film carrier with acrylate 1. This product also acts as a vapor barrier. However, it had only unsatisfactory initial adhesion on cement-based substrates containing residual moisture. As a result, a floor covering could not be applied with good quality, since the vapor barrier had distorted during application.

EXAMPLE 3 (COMPARATIVE EXAMPLE)

In a manner analogous to example 1, a self-adhesive vapor barrier was produced by applying a pressure-sensitive adhesive layer to a film carrier which is composed of polyethylene and has had an aluminum layer vapor deposited thereon and is provided with a pressure-sensitive adhesive layer, e.g. composed of polyacrylate, which is covered with a removable covering layer, on the other side of the film carrier with acrylate 3. This product also acts as a vapor barrier and has satisfactory initial adhesion to cement-based substrates containing residual moisture, and a floor covering can also be applied. However, the floor covering including vapor barrier has become detached from the substrate after some days due to unsatisfactory adhesion forces.

EXAMPLE 4 (COMPARATIVE EXAMPLE)

In a manner analogous to example 1, a self-adhesive vapor barrier was produced by applying a pressure-sensitive adhesive layer to a film carrier which is composed of polyethylene and has had an aluminum layer vapor deposited thereon and is provided with a pressure-sensitive adhesive layer, e.g. composed of polyacrylate, which is covered with a removable covering layer, on the other side of the film carrier with SBS 3. This product also acts as a vapor barrier and has satisfactory initial adhesion to cement-based substrates containing residual moisture, and a floor covering can also be applied. However, the floor covering including vapor barrier has become detached from the substrate after some days due to unsatisfactory adhesion forces.

EXAMPLE 5

A self-adhesive vapor barrier was produced in a manner analogous to example 1, but using acrylate 4 instead of SBS 2 as first pressure-sensitive adhesive layer.

This self-adhesive vapor barrier, too, is suitable for application to a cement-based substrate containing residual moisture. Likewise, the two-sided self-adhesive vapor barrier of example 5 remains on the substrate containing residual moisture after accelerated aging, as does a floor covering applied thereon after the removal of the covering layer.

The examples and comparative examples thus confirm, to a person skilled in the art, the importance of the features determined and disclosed which are necessary for successful performance of the invention.

The self-adhesive vapor barrier of the invention can be rolled up into a roll. Rolling is preferably carried out in such a way that the self-adhesive, open side is located on the inside in the roll and after rolling out becomes joined to the substrate and the side to be bonded to the floor covering is located at the top. For this purpose the second pressure-sensitive adhesive layer is for example covered with a paper liner as removable covering layer.

In addition, an associated covering tape which can serve for areal sealing can be concomitantly used in the system, but overlapping can also be employed instead of this.

The double-sided self-adhesive vapor barrier can, for example, be used for direct adhesive bonding of elastic and textile floor coverings, without further materials being required, onto new substrates containing residual moisture in the interior sector, with a previous water barrier seal being able to be dispensed with.

When a vapor seal is required, overlaps and/or a covering tape are preferably employed in order to give impermeable surfaces.

The self-adhesive vapor barrier of the invention can, for example, be applied to raw, cement-based, residually moist, water-resistant, surface-dry, load-bearing, dust-, dirt- and fat-free substrates, for example cement screed, filling compound, etc., which are preferably smoothed.

The drying out of concrete floors, composite screeds or floating screeds in buildings requires a lot of time. A screed often requires several weeks of drying time until it is ready to be covered with a troweling composition onto which an elastic floor covering can subsequently be adhesively bonded. Concrete floors often require a drying time of several months. Owing to the high pressure of time, vapor barriers are often employed.

The methods practiced at present are time-consuming and laborious and the materials used are often of concern from the point of view of occupational hygiene. A number of days are often necessary for the work to produce a suitable structure.

A substrate containing residual moisture, preferably one based on cement, can quickly be sealed and made ready for further processing by means of the self-adhesive vapor barriers according to the invention. Floor coverings can be applied directly on top of the self-adhesive vapor barriers according to the invention. The laid floor coverings can be immediately subjected to full loads.

The invention claimed is:

1. A self-adhesive vapor barrier, comprising:
   at least one carrier film;
   at least one moisture barrier layer;
   a first pressure-sensitive adhesive layer which is resistant to moisture and is present on a side of the self-adhesive vapor barrier facing the surroundings;
   a second pressure-sensitive adhesive layer which is present on a side of the carrier film opposite the first pressure-sensitive adhesive layer;
   a removable covering layer which has been applied to the second pressure-sensitive adhesive layer on a side of the self-adhesive vapor barrier facing the surroundings opposite the carrier film; and at least one barrier layer that is impermeable to plasticizers, wherein the first pressure-sensitive adhesive layer has, after application to a moisture-saturated fibrocement sheet, a peel resistance measured by a method based on DIN EN 1939: 2003 of ≥3.0 N/25 mm, and wherein the first pressure-sensitive adhesive layer has a peel resistance measured by a method based on DIN EN 1939: 2003 of ≥3.0 N/25 mm after accelerated aging on a moisture-saturated fibrocement sheet for 20 days at 50° C. with retention of the moisture content, wherein the at least one moisture barrier layer has an sD value, measured in accordance with ASTM E 398-13, of at least 50 m, wherein the first pressure-sensitive adhesive layer is resistant to alkaline moisture at a pH of equal to or more than 8.0 and equal to or less than 13.5, and wherein the self-adhesive vapor layer is free of a foam carrier layer.

2. The self-adhesive vapor barrier as claimed in claim 1, wherein the at least one moisture barrier layer and/or the at least one barrier layer which is impermeable to plasticizers is integrated into the carrier film.

3. The self-adhesive vapor barrier as claimed in claim 1, wherein the at least one moisture barrier layer is present between the at least one carrier film and the second pressure-sensitive adhesive layer and/or is in contact with the second pressure-sensitive adhesive layer.

4. The self-adhesive vapor barrier as claimed in claim 1, wherein the second pressure-sensitive adhesive layer has an adhesive application mass of 10-200 g/m².

5. The self-adhesive vapor barrier as claimed in claim 1, wherein the first pressure-sensitive adhesive layer has an adhesive application mass of 10-100 g/m².

6. The self-adhesive vapor barrier as claimed in claim 1, wherein the first pressure-sensitive adhesive layer consists of a pressure-sensitive adhesive material selected from the group consisting of pressure-sensitive adhesives based on rubber, natural rubber, synthetic rubber, acrylate, chloroprene rubber, styrene-acrylate, vinyl acetate, vinyl acetate-ethylene, vinyl versatate, polyethylene-vinyl acetate, polyethylene-vinyl versatate, polyacrylate, and/or mixtures and/or copolymers thereof.

7. The self-adhesive vapor barrier as claimed in claim 6, wherein the synthetic rubber comprises styrene-butadiene block copolymers (SBS).

8. The use of a self-adhesive vapor barrier as claimed in claim 1 for laying on a substrate containing residual moisture, wherein the substrate containing residual moisture is a residually moist substrate having a mineral basis and a residual moisture content of more than 1.8 CM-%, measured in accordance with SIA 253:2002.

9. A method for applying a moisture barrier layer to a substrate containing residual moisture, comprising:

applying a self-adhesive vapor barrier as claimed in claim 1 to the substrate containing residual moisture.

10. The method as claimed in claim 9, wherein a plurality of self-adhesive vapor barriers as claimed in claim 1 are applied in an overlapping manner.

11. The method as claimed in claim 9, wherein a plurality of self-adhesive vapor barriers as claimed in claim 1 are applied so as to adjoin one another and after the stripping away of the removable covering layer at the adjoining places are joined using at least one one-sided and/or two-sided self-adhesive tape and/or at least one one-sided and/or two-sided self-adhesive tape is applied to the substrate containing residual moisture underneath the adjoining places of the self-adhesive vapor barriers and the self-adhesive vapor barriers are applied on top of the at least one one-sided and/or two-sided self-adhesive tape, with the at least one one-sided and/or two-sided self-adhesive tape having at least one moisture barrier layer.

12. The method as claimed in claim 11, wherein the moisture barrier layer of the at least one one-sided and/or two-sided self-adhesive tape has an sD value, measured by a method based on ASTM E 398-13, of at least 50 m.

13. The method as claimed in claim 9, further comprising pulling-off of the removable covering layer after application of the self-adhesive vapor barrier and optionally application of a floor covering on top of the second pressure-sensitive adhesive layer.

14. The method as claimed in claim 13, wherein the floor covering is a rubber, polyvinyl chloride, linoleum, enomer, or textile floor covering.

* * * * *